Oct. 4, 1938.    L. G. COPEMAN    2,132,230
PROTECTIVE COATING AND PROCESS OF APPLYING AND REMOVING

Filed Jan. 17, 1934

INVENTOR.
Lloyd G. Copeman
BY
Barnes, Kisselle & Laughlin
ATTORNEYS.

Patented Oct. 4, 1938

2,132,230

UNITED STATES PATENT OFFICE 2,132,230

PROTECTIVE COATING AND PROCESS OF APPLYING AND REMOVING

Lloyd G. Copeman, Flint, Mich., assignor to Copeman Laboratories Company, Flint, Mich., a corporation of Michigan Application January 17, 1934, Serial No. 706,954

5 Claims. (Cl. 91—68)

This invention relates to protective coatings and process of applying and removing, and has to do particularly with temporary coatings adapted to be applied to articles or surfaces to protect the same during their manipulation or making up into finished goods.

This application is a continuation in part of my copending application Serial No. 597,013, filed March 5, 1932.

The idea of applying a temporary, readily peelable coating such as latex to articles is disclosed by Van Deventer Reissue 18,734 and as disclosed in my said copending application Serial No. 597,013, such temporary latex coatings were improved by the use of a backing material with a thin layer of plastically applied latex or similar aqueous dispersion of rubber, said backing material bonding to the latex when set up to form a tough protective coating and to make such protective coating easily removable in large sheets.

The subject matter of the present invention, which is a division of said prior application, has to do with the application of an aqueous dispersion of rubber, such as latex or any other solution containing a solvent, which will set up in the form of a coating to a surface or surfaces, so as to protect such surface or surfaces during their fabrication or manipulation into manufactured goods or assemblies. The gist of the improvement, in any case, is the easy peelability of the temporary coating.

In some modifications, where the application is to fibrous materials, this is enhanced by the coating of the material to be protected and preserved with a substance which repels or at least prevents the rubber deposited coating from adhering to the fibrous material. Other modifications embody the step of applying or utilizing a backing coating such as a dry aggregate which permits the use of but a single thin layer of deposited rubber and which not only accelerates the setting up of the latex or the like but which assists in the removal of the temporary protective coating.

The coating material as used in the present process may vary considerably, but in most cases I preferably use a coating material which is held in solution by a solvent or any other suitable carrying agent. This solution may be any of the various lacquers or aqueous dispersions of rubber, such as latex and, as will be later pointed out, such rubber dispersions may be so loaded with a filler as to be very plastic and just barely pour.

The aqueous dispersion of rubber or other coating agent may, of course, have various concentrations and may be combined with cheaper fillers such as clay. For instance, a mixture of latex and two hundred mesh clay will make a very desirable coating which is so thick that it will hardly pour but which may be easily sprayed upon the article to be coated. Regardless of the kind of coating material used, and whether temporary or permanent, I preferably accelerate the setting up action and the completion of the finished coating by adding a dry secondary coating material either with the plastically applied coating material or on top of the layer or layers of plastically applied coating material. This accelerating coating material may be paper, wood flour, ground rubber, cotton dust, etc.

Figure 2:
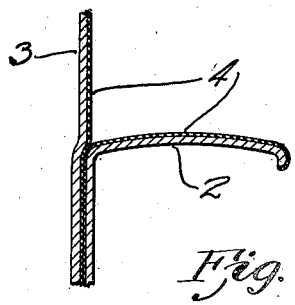
Figs. 2 and 3 illustrate the assembly of two separately coated articles according to the present process when a portion of the coating is a temporary one and is removable as shown in Fig. 3 and the remainder of the coating firmly positioned between the two articles.
Figure 3:
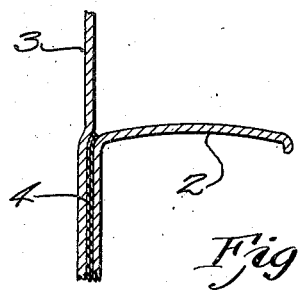

In coating automobile parts, such as shown in Figs. 2 and 3, I may first spray a complete fender 2 with a coating substance which may be in solution or plastic state. This initial coating may be applied by dipping in the usual manner or, as disclosed in my copending application Serial No. 593,279, filed February 16, 1932, the coating solution such as latex may be first applied to paper and the coated side of the paper, while still plastic, then applied to the fender, but in the present invention I preferably spray the finished coating on the surface to be protected. While the initially applied coating is still wet I apply the backing material such as paper, wood flour, or finely ground rubber. This backing material adheres to the relatively sticky surface of the initial coating and such backing material materially accelerates the setting up time of the coating by absorbing or at least assisting by absorption or capillarity in evaporating the solvent or carrying agent such as water in the case of latex.

For the typical single coating for fenders, automobile bodies and similar articles, I may complete the coating by applying a second layer of coating material which is preferably latex. Suitable accelerators may be combined with this final layer of latex or other coating material to assist in the setting up action.

I have found that if a filler such as clay is added to the aqueous dispersion of rubber or other coating material it is comparatively difficult to peel the coating from the surface, but that if a backing material of wood flour, paper, or similar dry aggregate or coating material is added to the surface of the coating while still wet, the resulting coating may be easily peeled off in large strips. In other words, regardless of the particular type or kind of initial coating material used, the adding of the backing material helps materially in the setting up of the coating, in adding sufficient body to make the coating easily stripped off in large sheets, and in building up a protective coating of sufficient resilience and body which is materially cheaper than the same thickness of coating built up from successive layers of the base coating material. The wood flour, ground rubber or other backing material is less expensive than the original coating material and the use of such backing material presents a much superior coating to that built up from the successive layers of latex or the like.

Regardless of the particular ingredients and specific method of application of the temporary protective coating, one of the important features of the present application resides in the protective coating of various parts which go into the making up or assembling of a complete article. For instance, referring particularly to Fig. 2, the fender 2 may be coated with a layer of latex and a layer of ground rubber, the body 3 of the automobile may be coated similarly. The fender may be then shipped to the body plant or both the body and fenders shipped to an assembly plant and the fender bolted to the body in the usual manner, both articles, of course, receiving protection during such shipping, handling, and assembly; the manner of coating preferably being such as not to cover up the respective bolt holes of the two articles. The remainder of the automobile may then be assembled and shipped or driven to its destination after which the exposed portions of the temporary protective coating material 4 may be removed, as best illustrated in Fig. 3, leaving the two layers of material 4 between the assembled fender and the body to act as a non-squeak material.

Figure 1:
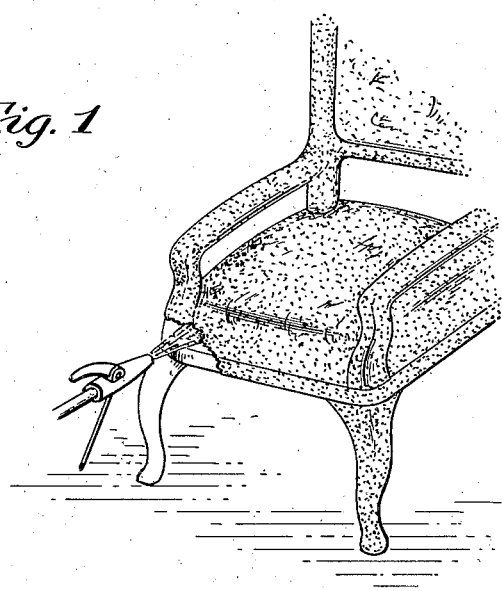
Fig. 1 is a perspective view illustrating the manner of applying the rubber protective coating to upholstery and furniture.

In Fig. 1 I have shown the application of my process to furniture and upholstery. In this case the cloth may be initially treated with a thin coating material; a preferred solution of which may be prepared by adding eighty parts of commercial alcohol, preferably containing not more than 10% of water, denaturing or other impurities, to 18 parts of a rich varnish of gum shellac, such as the "shellac in alcohol" of commerce, consisting of a viscid solution in alcohol of orange or white gum shellac. To the above ingredients may be added two parts of castor oil, more or less; and then coated with a basic coating material and backing material, either combined or separately, threads of the cloth having been treated as described above, the coating material such as latex will be prevented from bonding with the cloth and may thus be very easily stripped off when desired. It is possible with most fabrics to coat them directly according to the present process, the backing material having sufficient bonding action with the basic coating material as to cause such coating to be easily peeled off. It will be understood that other colloid or amorphous substances adapted to dry in a horny pellicle, or capable of being applied in other limpid solutions adapted to readily evaporate, are capable of use as a coating material; for instance, a solution containing cellulose acetate dissolved in acetone, with a clarifier of methyl alcohol and benzol and a softener of salol and triphenyl phosphate.

What I claim is:

1. In the art of temporarily protecting articles having at least a portion of the exposed surface area formed of textile material during handling, shipping, storage and the like, the process of protecting such surface of textile material which comprises first sealing the fibers of the textile material with a coating material, applying a coating of latex the rubber deposit from which will be prevented from adhering to the textile material by said initial coating whereby the said textile material will be temporarily protected during handling, shipping and the like, and which coating of latex may be easily stripped from the treated textile material to expose the protected surface.

2. In the art of temporarily protecting articles having at least a portion of the exposed surface area formed of textile material during handling, shipping, storage and the like, the process of forming a protective readily peelable temporary coating for said surface of textile material which comprises treating the textile material with a substance to prevent subsequently applied protective coatings from bonding with the textile material, applying a temporary coating substance in the form of an aqueous dispersion of rubber to said treated textile material, allowing said coating material to set up into a homogeneous protective coating which may subsequently be easily stripped from the treated textile material.

3. In the art of temporarily protecting articles having at least a portion of the exposed surface area formed of textile material during handling, shipping, storage and the like, the process of forming a protective readily peelable temporary coating for said surface of textile material which comprises treating the textile material with a substance which will not harm the textile material and which will prevent subsequently applied protective coatings from bonding with the textile material, applying a temporary coating substance in the form of an aqueous dispersion of rubber to said treated textile material, allowing said coating material to set up into a homogeneous protective coating which may subsequently be easily stripped from the treated textile material.

4. In the art of temporarily protecting articles having at least a portion of the exposed surface area formed of textile material during handling, shipping, storage and the like, the process of forming a protective readily peelable temporary coating for said surface of textile material which comprises treating the textile material with a substance to prevent subsequently applied protective coatings from bonding with the textile material, applying temporary coating substances including an aqueous dispersion of rubber and a coating of liquid absorbent relatively inert cheap building up material, depositing the rubber from said aqueous dispersion, said building up material being bonded to the rubber coating during the setting up step to form a flexible coating, said building up material protecting the textile material during handling, shipping and the like and assisting in making the complete coating readily peelable from the treated textile material.

5. In the art of temporarily protecting articles during shipping, handling, storage, and the like, the process of protecting articles having a portion thereof formed of textile material, which comprises, sealing the fibers of the textile material, and then adding temporary readily peelable coating substances including a flexible elastic coating material dessiminated in a liquid vehicle and adapted to set up into a flexible homogeneous non-tacky coating and a relatively dry and inert coating substance selected from the group which consists of paper, wood flour, ground rubber, cotton dust, plaster of Paris, and cereal flours, for adding sufficient body to the coating substance applied with the liquid vehicle to make the complete coating readily removable in large sheets.

LLOYD G. COPEMAN.